United States Patent [19]

Drews

[11] Patent Number: 4,748,308

[45] Date of Patent: May 31, 1988

[54] MICROWAVE OVEN TOASTER

[76] Inventor: Robert C. Drews, 211 N. Meramac Ave., Clayton, Mo. 63105

[21] Appl. No.: 2,382

[22] Filed: Jan. 12, 1987

[51] Int. Cl.$^4$ .......................... H05B 6/80; A47J 37/08
[52] U.S. Cl. ................................ 219/10.55 E; 99/385; 99/391; 99/393; 99/451; 219/10.55 R; 426/242
[58] Field of Search .......................... 99/385, 388–393, 99/399, 401, 451; 219/10.55 R, 10.55 E, 10.55 F, 10.55 M; 426/241–243

[56] References Cited

U.S. PATENT DOCUMENTS

| | | | |
|---|---|---|---|
| 3,591,751 | 7/1971 | Goltsos | 219/10.55 E |
| 3,701,872 | 10/1972 | Levinson | 219/10.55 E |
| 4,190,757 | 2/1980 | Turpin et al. | 219/10.55 E |
| 4,272,663 | 6/1981 | Green | 219/10.55 E |
| 4,346,651 | 8/1982 | Schickidanz | 99/392 |
| 4,590,349 | 5/1986 | Brown et al. | 99/451 X |

Primary Examiner—John Petrakes
Attorney, Agent, or Firm—Hugh D. Jaeger

[57] ABSTRACT

A microwave toaster including a rectangular block of microwave transparent material including a plurality of parallel and aligned slots therein for receiving cards of material which absorb microwave energy and subsequently dissipates heat therefrom. A piece of bread is positioned next to the material to absorb the heat dissipated therefrom for subsequently turning into browned toast.

1 Claim, 4 Drawing Sheets

MICROWAVE OVEN TOASTER

BACKGROUND OF THE INVENTION

1. Field of the Invention

The present invention pertains to microwave ovens, and more particularly, pertains to a toaster for microwave ovens for toasting pieces of bread or warming of other like food articles either in a horizontal or vertical plane.

2. Description of the Prior Art

Prior art devices have not provided for the toasting of ordinary pieces of bread as might be found in a typical toaster in one's home. The prior art has only found for heating bread-like goods, such as pizza, on one side but has not specifically dealt with the heating and toasting of bread or like goods on both sides, such as a piece of ordinary bread referred to commonly as "toast".

The present invention overcomes the disadvantages of the prior art by providing a microwave oven toaster.

SUMMARY OF THE INVENTION

The general purpose of the present invention is to provide a microwave oven toaster for toasting pieces of bread, and more generally, to also provide a cooking utensil for utilization in a microwave oven for heating both sides of food items.

According to one embodiment, there is provided a rectangular block of microwave transparent material including a plurality of parallel and aligned slots for accepting cards of material which when absorbing microwave oven energy, subsequently radiate thermal energy outwardly accordingly. The structure can be used in either a vertical or horizontal sense, such as for browning pieces of toast or other like food items accordingly. The structure can be oriented for food items requiring positioning in a horizontal plane of the structure.

One significant aspect and feature of the present invention is microwave oven toaster for browning pieces of toast.

Another significant aspect and feature of the present invention is a microwave oven toaster which can either be utilized in a vertical or horizontal plane.

Having thus described the principal embodiments of the present invention, it is the principal object hereof to provide a microwave oven toaster.

One object of the present invention is being able to toast both sides of bread in a microwave oven, such that the bread is evenly browned and toasted to form a light crust against the outer surfaces of each side of the bread as well as about the entire crust encompassing the piece of bread.

Another object of the present invention is a microwave toaster oven which can be utilized to toast in a vertical or horizontal position.

DESCRIPTION OF THE PREFERRED EMBODIMENTS

Figure 1:
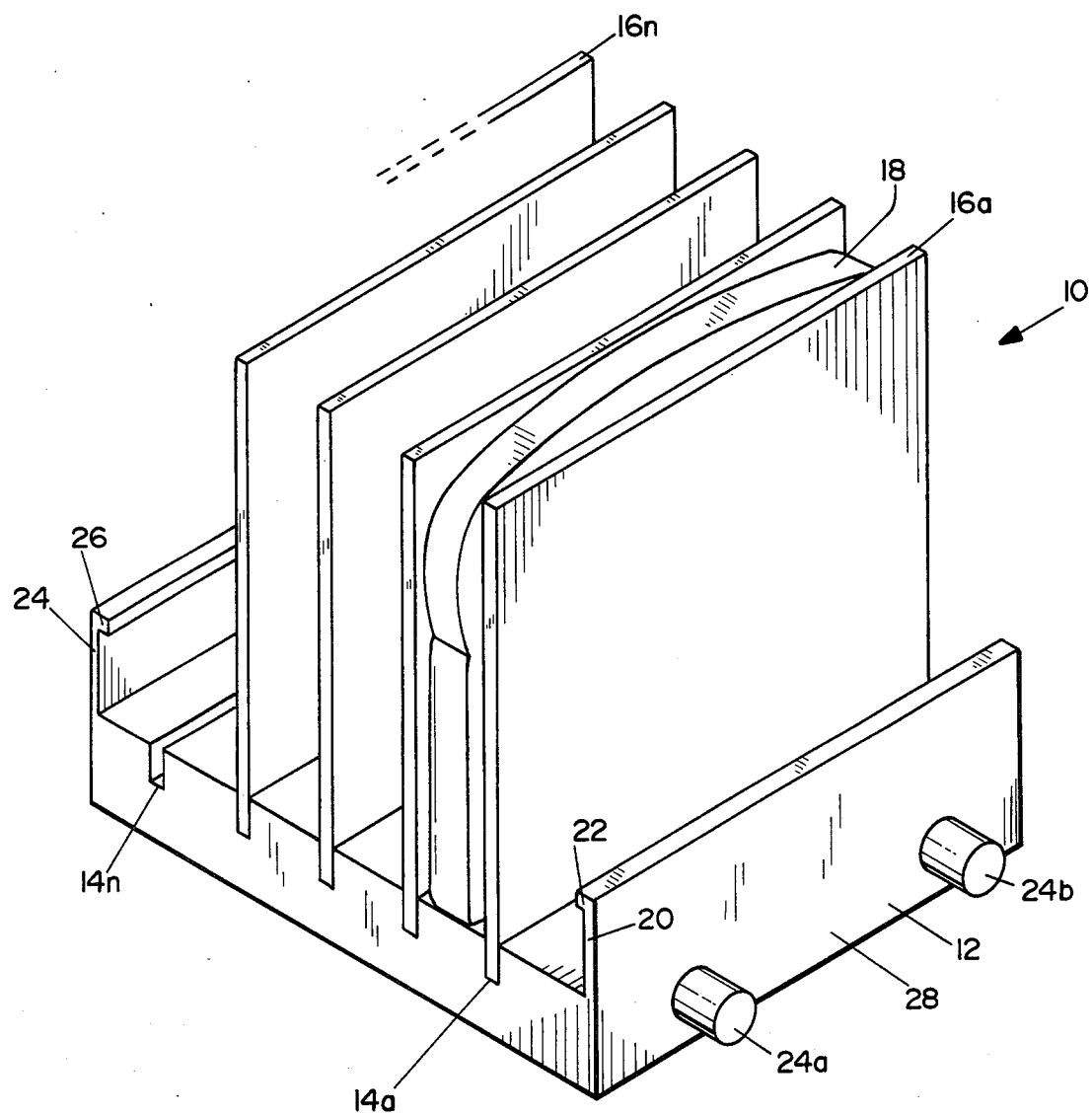
FIG. 1 illustrates a perspective view of a microwave oven toaster, the present invention.
Figure 2:
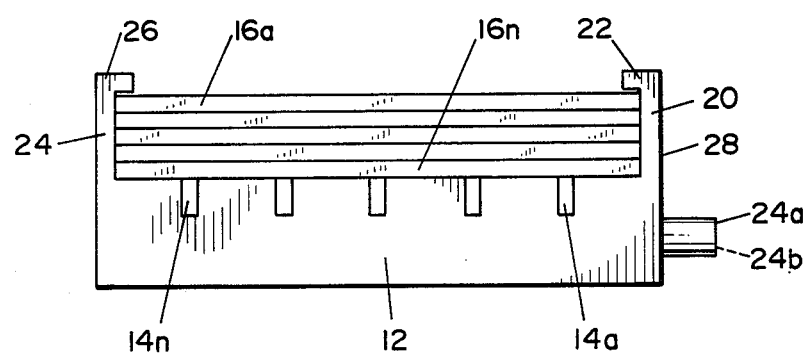
FIG. 2 illustrates a side view of the microwave oven toaster as stored.

FIG. 1 illustrates a perspective view of a microwave oven toaster 10, the present invention including a rectangular block of microwave transparent material 12 such as a polymer or fluorocarbon polymer including a plurality of longitudinal parallel and aligned slots 14a-14n. By way of example and for purposes of illustration only, there are provided five slots in this example. A plurality of substantially rectangular cards such as square cards 16a-16n insert in a line within the slots 14a-14n. The cards 16a-16n are of a ferrite or similar material which absorb microwave energy and subsequently convert the microwave energy into thermal energy for subsequent transmission to an item such as a piece of toast 18. Rectangular block 12 includes a right angled member 20 including a lip 22 as well as corresponding members 24 and 26 to provide for storage of the ferrite cards 16a-16n therebetween as illustrated in FIG. 2. Polymer or fluorocarbon polymer rods 24a and 24b extend from surface 28 of block 12 for alternate orientation of the oven toaster 10 within a microwave oven.

FIG. 2 illustrates a side view of the microwave oven toaster including the base member 12 as well as the heating members 16a-16n as stored away accordingly between angled members 20 and 24. This provides for not only safe and easy transportation of the microwave oven toaster prior to utilization, but also for storage such as in a kitchen drawer or as situated in the kitchen. The members can also be painted an interesting color so as to match with the kitchen decor. The structure is also dishwasher safe, so as to be able to "popped" into the dishwasher by any individual either as a unit or componently separated.

Figure 3:
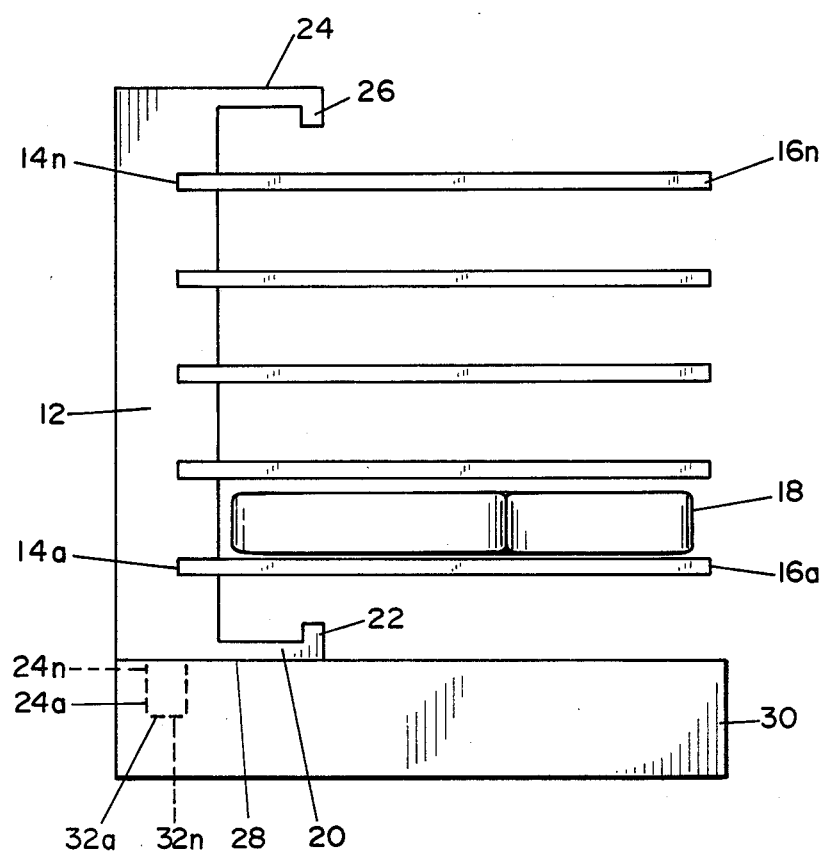
FIG. 3 illustrates a side view of the microwave oven toaster in a horizontal mode of operation; and, FIG. 4 illustrates a stack of pieces of bread and ferrite members.

FIG. 3 illustrates an alternative embodiment of the present invention including a base support member 30 with block 12 and extending rods 24a and 24b in alignment with the engaging within holes 32a and 32b in base support member 30. This provides for horizontal orientation of the members 16a-16n and bread pieces 18 for subsequent microtoasting. All numerals correspond to those elements previously described.

Figure 4:
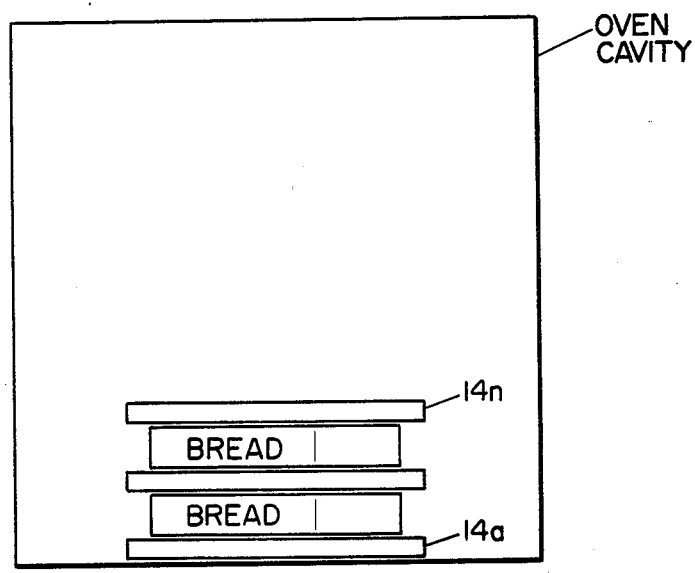

FIG. 4 illustrates a side view of another alternative embodiment of the plurality of ferrite members 14a-14n alternating with slices of bread.

MODE OF OPERATION

The microwave oven toaster 10 is positioned in a central part of a microwave cavity and provides for optimum performance at least two members of converting material 16a and 16b with a piece of bread 18 therebetween. The microwave energy heats the members 16a-16n which converts the microwave energy to thermal energy and subsequently radiates outwardly and provides for browning of surfaces of a piece of bread and heats and makes it into toast accordingly. The toast subsequently browns on the outer surfaces rather than cooking entirely through only heating the inner surfaces with a slight amount of thermal radiation as well as microwave radiation. Accordingly, the bread is subsequently converted into toast by thermal energy as well as microwave energy and provides for a suitable piece of toast for subsequent buttering, jamming or honeying, etc.

Various modifications can be made to the present invention without departing from the apparent scope thereof.

I claim:

1. In combination, a microwave oven toaster and pieces of bread comprising of:
   a. a rectangular block of microwave transparent material including a plurality of parallel aligned slots, and at least two cards which are of microwave material for converting microwave energy into thermal energy inserted into said slots; and,
   b. a piece of bread inserted on the top portion of said block material between said cards which are aligned into said slots whereby said cards convert microwave energy in the card material into radiant thermal energy thereby heating and toasting outer surfaces of said bread while microwave energy heats said bread thereby converting said bread into a piece of toast.

* * * * *